US012678813B2

(12) United States Patent
Marc et al.

(10) Patent No.: US 12,678,813 B2
(45) Date of Patent: Jul. 14, 2026

(54) OPENING/CLOSING AND VAPORIZING MECHANISM FOR A BOTTLE, FOR EXAMPLE OF PERFUME, AND SUCH A BOTTLE

(71) Applicant: COMPTOIR NOUVEAU DE LA PARFUMERIE, Paris (FR)

(72) Inventors: Nicolas Marc, Acquigny (FR); Laurent Penalva, Ande (FR); David Petit, Montigny (FR)

(73) Assignee: COMPTOIR NOUVEAU DE LA PARFUMERIE, Paris (FR)

( * ) Notice: Subject to any disclaimer, the term of this patent is extended or adjusted under 35 U.S.C. 154(b) by 142 days.

(21) Appl. No.: 18/713,119

(22) PCT Filed: Nov. 23, 2022

(86) PCT No.: PCT/FR2022/052162

§ 371 (c)(1),
(2) Date: May 23, 2024

(87) PCT Pub. No.: WO2023/094767

PCT Pub. Date: Jun. 1, 2023

(65) Prior Publication Data

US 2025/0025901 A1 Jan. 23, 2025

(30) Foreign Application Priority Data

Nov. 24, 2021 (FR) ....................................... 2112430

(51) Int. Cl.
*B05B 11/10* (2023.01)
*A45D 34/02* (2006.01)

(52) U.S. Cl.
CPC .......... *B05B 11/1047* (2023.01); *A45D 34/02* (2013.01); *B05B 11/1052* (2023.01); *A45D 2200/057* (2013.01)

(58) Field of Classification Search
CPC . B05B 11/1047; B05B 11/1052; A45D 34/02; A45D 2200/057
See application file for complete search history.

(56) References Cited

U.S. PATENT DOCUMENTS 4,821,930 A * 4/1989 Luine .................... G01F 11/263 222/513
5,255,823 A 10/1993 Tichy et al.
(Continued)

FOREIGN PATENT DOCUMENTS

EP 1829791 A1 9/2007
FR 2959215 A1 10/2011
FR 2996537 A1 4/2014

OTHER PUBLICATIONS

International Search Report for PCT/FR2022/052162 mailed Mar. 16, 2023, 4 pages.
(Continued)

*Primary Examiner* — Jeremy Carroll
(74) *Attorney, Agent, or Firm* — NIXON & VANDERHYE

(57) ABSTRACT

The invention relates to an opening/closing and vaporizing mechanism for a bottle including a collar (6) connected on the bottle by a rotational movement, a push button (8) mounted movable in translation, and a sleeve (7) mechanically connected to the collar and mounted movable in translation, with the mechanism which is configured such that, in a first position known as the upper position of the sleeve, at least one complementary stop and guide notch (18) is sandwiched between at least one stop notch (40) and at least one retaining notch (39) such that the sleeve is maintained in its upper position with the push button inaccessible, whilst in a second position known as the lower position of the sleeve, the at least one complementary stop and guide notch is at a distance from the at least one stop notch having
(Continued)

been urged against the at least one retaining notch such that the push button is accessible.

15 Claims, 8 Drawing Sheets

(56) References Cited

U.S. PATENT DOCUMENTS

2014/0252128 A1* 9/2014 Ivri .................... B05B 11/1066
239/308
2015/0352579 A1* 12/2015 Burrowes .......... B05B 11/1084
239/304
2021/0114049 A1* 4/2021 Rousseau ........... B05B 11/1047

OTHER PUBLICATIONS

Written Opinion of ISA for PCT/FR2022/052162 mailed Mar. 16, 2023, 7 pages.

* cited by examiner

OPENING/CLOSING AND VAPORIZING MECHANISM FOR A BOTTLE, FOR EXAMPLE OF PERFUME, AND SUCH A BOTTLE

CROSS-REFERENCE TO RELATED APPLICATIONS

This application is the U.S. national phase of International Application No. PCT/FR2022/052162 filed Nov. 23, 2022, which designated the U.S. and claims priority to FR 2112430 filed Nov. 24, 2021, the entire contents of each of which are hereby incorporated by reference.

TECHNICAL FIELD OF THE INVENTION

The present invention relates to an opening/closing and vaporizing mechanism for a bottle, for example of perfume.

It also relates to a bottle, in particular used in perfumery, provided with such an opening/closing and vaporizing mechanism.

PRIOR ART

Containers are known comprising a fluid and a pump for vaporizing the fluid contained in the container.

The European patent EP 1 829 791 describes such a container including a body defining an inner volume provided to receive the fluid and having a neck above it provided with an orifice through which a vaporization pump is inserted.

A lid is fitted over the neck around the pump, whilst the pump is provided with a push button that can be moved between an upper position and a lower vaporization position, along the lid. The push button is provided with protrusions which slide in grooves formed on an inner face of the lid when the push button is moved between its upper position and its lower position.

A cover is mounted so that it can move around the push button between a position where it partially conceals the push button and a position where it provides access to the push button. The cover is provided in particular with inner ribs which slide in grooves formed on an outer face of the lid when the cover is moved between its position where it partially conceals the push button and its position where it provides access to the push button.

An outer sleeve is connected to the lid at the neck of the container. This outer sleeve can be rotated relative to the container, the lid, the cover and the pump. The outer sleeve is provided with an inner face in which curved grooves are formed which extend along the outer sleeve. The cover is also provided with drive pins housed in the curved grooves of the outer sleeve.

When the outer sleeve is rotated, it moves the cover translationally from its position where it partially conceals the push button to its position where it provides access to the push button, or vice versa. In this way, rotating the outer sleeve makes it possible to operate the push button or not with a view to dispensing the fluid or not.

In the position of the cover where it partially conceals the push button, a stop formed projecting from the cover comes into contact with the push button and an elastic tab formed projecting from the cover is housed in a groove formed at an upper end of the outer sleeve.

DISCLOSURE OF THE INVENTION

The aim of the invention is to provide an opening/closing and vaporizing mechanism for a bottle, for example of perfume, which is particularly easy and convenient to use.

According to a first aspect, one object of the invention is thus an opening/closing and vaporizing mechanism for a bottle, for example of perfume, including a vaporization pump configured to be partially inserted into the bottle, a push button connected to the vaporization pump and configured to operate it, characterised in that it includes a collar configured to be connected on the bottle by a rotational movement of the collar relative to the bottle, with the push button which is mounted movable in translation above and relative to the collar, and a sleeve mechanically connected to the collar and mounted movable in translation around and relative to the collar and to the push button, between a first position, known as the upper position, in which the push button is inaccessible and a second position, known as the lower position, in which the push button is accessible and can be operated by a user; with at least one of the sleeve and the collar which is provided with at least one guide groove, at least one retaining notch formed in the groove and at least one stop notch formed in the guide and facing the at least one retaining notch, while at least the other of the collar and the sleeve is provided with at least one complementary stop and guide notch formed so as to project and face the at least one guide groove; and with the opening/closing and vaporizing mechanism which is configured such that, in the first position known as the upper position of the sleeve, the at least one complementary stop and guide notch is sandwiched between the at least one stop notch and the at least one retaining notch such that the sleeve is maintained in the upper position with the push button inaccessible, whilst in the second position known as the lower position, the at least one complementary stop and guide notch is at a distance from the at least one stop notch having been urged against the at least one retaining notch such that the push button is accessible.

Thanks to the arrangement of the sleeve and collar, the opening/closing and vaporizing mechanism according to the invention provides a particularly easy and convenient solution to authorise or not authorise, and thus secure, the operation of the push button.

Indeed, by simply moving the sleeve around and in relation to the collar, the opening/closing and vaporizing mechanism moves from a so-called storage configuration in which the push button is inaccessible to a so-called vaporizing configuration in which the push button is accessible.

In addition, thanks to a system of notches and groove(s) as described above, the storage and vaporizing configurations of the opening/closing and vaporizing mechanism are configurations in which the sleeve is in stable upper and lower positions.

Moreover, in the opening/closing and vaporizing mechanism according to the invention, the sleeve and the collar are configured so that rotating the sleeve enables the collar to be rotated with a view to removing it from the bottle, by the at least one complementary stop and guide notch cooperating with longitudinal edges of the at least one guide groove.

In other words, thanks to the arrangement of the sleeve and collar, the opening/closing and vaporizing mechanism fulfils several functions here, including a function for accessing the push button and a torque transmission function for disassembling the mechanism with a view to filling the bottle, for example.

Particularly simple, convenient and cost-effective preferred features of the opening/closing and vaporizing mechanism according to the invention are set out below.

The collar is at least partially internally threaded and screwed onto the bottle.

The collar has a substantially cylindrical shape, and is provided with a first cylindrical side wall defining a first outer face and a first inner face which delimits, with an upper flange of the collar, a first inner space open to a first lower end.

The at least one complementary stop and guide notch is formed on the first cylindrical side wall projecting from the outer face of the collar.

The at least one complementary stop and guide notch is located on the side of the upper flange, at a distance from the first lower end of the collar.

The collar is configured to receive at least partially a neck of the bottle in its first inner space.

The vaporization pump includes a pump body at least partially received in the first inner space of the collar, and a vaporization duct extending from the pump body and opening through an orifice formed in the upper flange of the collar.

The push button has a second cylindrical wall, a support wall sitting on top of the second cylindrical wall and a vaporization chamber connected at a first end to the vaporization duct and opening out at a second end, opposite the first end, through the second cylindrical wall.

The collar is provided with a shoulder on which the push button is connected by its second cylindrical wall.

The sleeve has a substantially cylindrical shape, and is provided with a third cylindrical side wall and an upper opening through which the push button either emerges or does not depending on the position of the sleeve.

In the first position of the sleeve, the push button is under the upper opening of the sleeve and is thus inaccessible; whereas in the second position of the sleeve, the push button emerges through the upper opening of the sleeve and is thus accessible to be operated by the user.

The third cylindrical side wall of the sleeve defines a third outer face and a third inner face which delimits a third inner space open to a third lower end.

The at least one groove is formed in the third inner face of the sleeve, and the at least one retaining notch and the at least one stop notch are formed in the third inner face of the sleeve, at least partially projecting into the at least one groove.

The at least one groove extends substantially from the third lower end of the sleeve to near an upper edge of the sleeve, at its upper opening.

The at least one retaining notch and the at least one stop notch are located on the side of the third lower end of the sleeve, at a distance from its upper opening.

According to a second aspect, another object of the invention is a bottle, in particular used in perfumery, including a receptacle defining a volume and having a neck above it, and an opening/closing and vaporizing mechanism as described above and connected by a rotational movement on the neck of the receptacle.

The vaporization pump is partially inserted into the neck and opens at a first end into the volume of the recipient.

The push button is connected to a second end of the vaporization pump, opposite its first end.

The collar is internally threaded and screwed onto an outer face of the neck.

DETAILED DESCRIPTION

Figure 1:
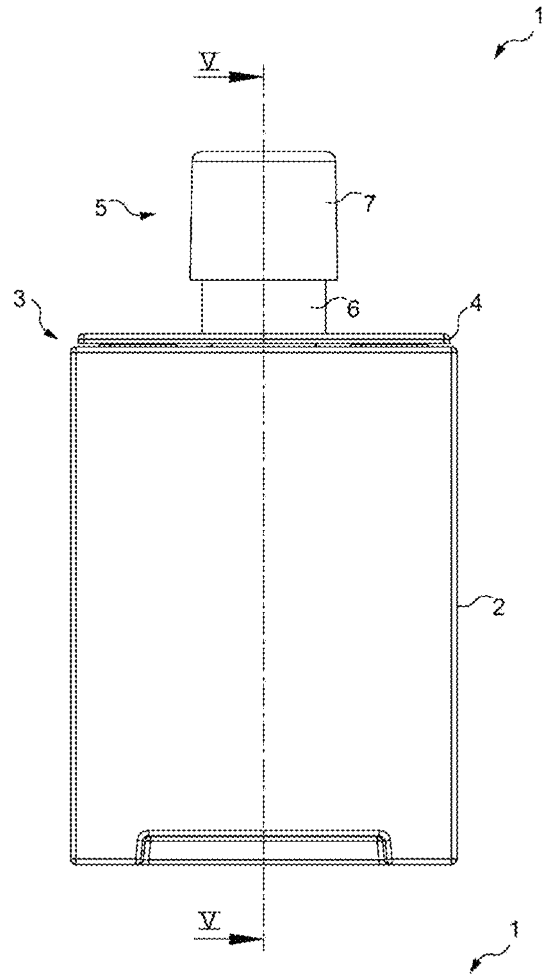
FIG. 1 shows a front view of a bottle, for example used in the field of perfumery, fitted with an opening/closing and vaporizing mechanism which is in a so-called storage configuration here.
Figure 2:
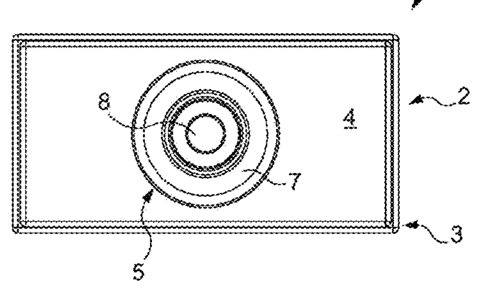
FIG. 2 is a top view of the bottle shown in FIG. 1.

FIGS. 1 and 2 show a bottle 1, in particular used in perfumery, including a recipient 2, or container, defining a volume for receiving a fluid such as perfume.

The bottle 1 has an ornamental plate 4 on an upper part 3 here.

The recipient 2 has a neck above it (shown in FIGS. 5, 6, 9 and 10) extending from the upper part 3.

The bottle 1 includes an opening/closing and vaporizing mechanism 5 mounted on the neck of the recipient 2.

The opening/closing and vaporizing mechanism 5 is provided in particular with a collar 6 configured to be connected on the bottle 1 by a rotational movement of the collar 6 relative to the bottle 1, with a sleeve 7 mechanically connected to the collar 6 and mounted movable in translation around and relative to the collar 6, and with a push button which is mounted movable in translation above and relative to the collar 6.

The sleeve 7 can move between a first position, known as the upper position, in which the push button 8 is inaccessible, as in FIGS. 1 and 2, and a second position, known as the lower position, in which the push button 8 is accessible and can be operated by a used to vaporize the perfume (see below for more details).

Figure 3:
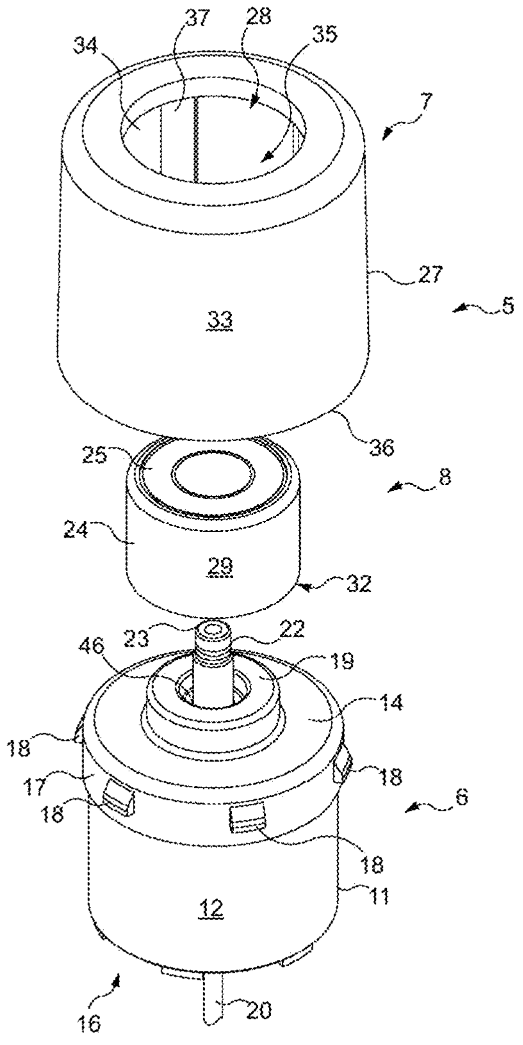
FIG. 3 is an exploded perspective view of the opening/closing and vaporizing mechanism, from a first viewing angle.
Figure 4:
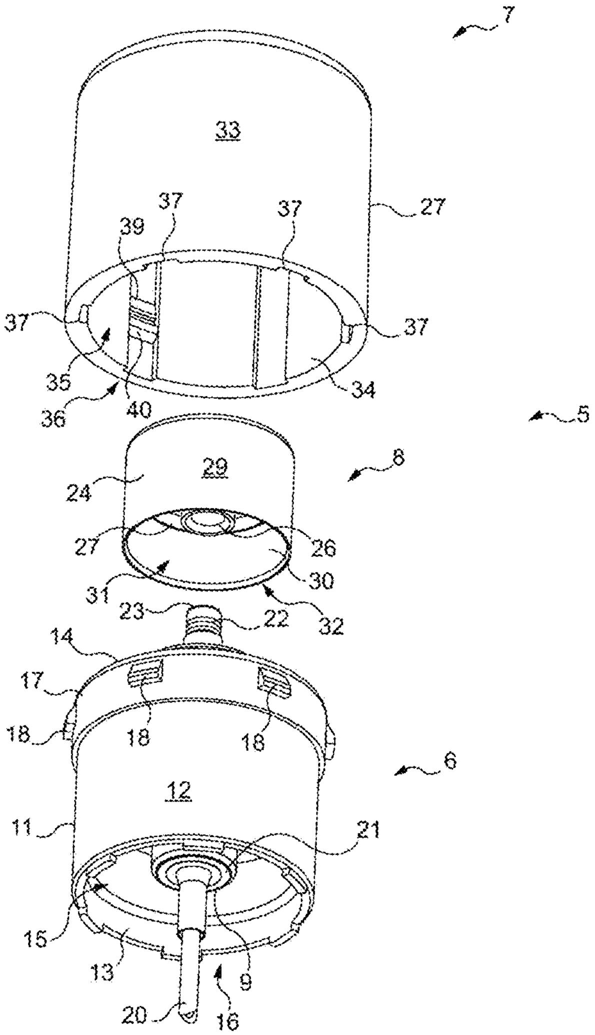
FIG. 4 is a view similar to that in FIG. 3 but from a different viewing angle.

FIGS. 3 and 4 are an exploded perspective view of the opening/closing and vaporizing mechanism 5, referred to hereinafter as mechanism for the sake of brevity.

In addition to the collar 6, the sleeve 7 and the push button 8, the mechanism 5 includes a vaporization pump 9 configured to be partially inserted into the bottle 1, with the push button 8 which is connected to the vaporization pump 9 and which is configured to operate it by user pressure.

In detail, the collar 6 has a substantially cylindrical shape.

The collar 6 is provided with a first cylindrical side wall 11 defining a first outer face 12 and a first inner face 13.

The first inner face 13 delimits, with an upper flange 14 of the collar 6, a first inner space 15 open to a first lower end 16 of the collar 6.

The collar 6 also has, at the junction between the upper flange 14 and the first cylindrical side wall 11, a portion 17 forming a thickened section of the first cylindrical side wall 11 here.

The mechanism 5 is also provided here with a plurality of complementary stop and guide notches 18.

These complementary stop and guide notches 18 are arranged evenly here around the cylindrical circumference of the portion 17 of the collar 6, projecting from the outer face 12 of the collar 6.

These complementary stop and guide notches 18 are therefore located here on the side of the upper flange 14, at a distance from the first lower end 16 of the collar 6.

The collar 6 is also provided with a shoulder 19 projecting from the upper flange 14 and pierced by an orifice 46 which opens into the first inner space 15.

It should be noted that the collar 6 is configured to receive at least partially the neck of the bottle 1 in its first inner space 15 (see details below).

In particular, the collar 6 is partially internally threaded, i.e. on its first inner face 13, so as to be screwed onto an outer face, which is itself threaded, of the neck of the bottle 1.

The vaporization pump 9 includes a pump body 21 partially received in the first inner space 15 of the collar 6.

The vaporization pump 9 is configured to be partially inserted into the neck of the bottle 1 and to open into the volume of the recipient 2 at a first end 20 of a vaporization duct 22 of the vaporization pump 9.

The vaporization duct 22 extends from the pump body 21 and opens through the orifice 46 formed in the upper flange 14 of the collar 6, via a second end 23 of the vaporization duct 22 which is opposite the first end 20.

The push button 8 has a second cylindrical wall 24 defining a second outer face 29 and a second inner face 30, as well as a support wall 25 sitting on top of the second cylindrical wall 24 and delimiting, with the second inner face 30 a second inner space 31 open to a second lower end 32 of the push button 8.

The second cylindrical wall 24 of the push button 8 is connected to the shoulder 19 of the collar 6, which is at least partially received in the second inner space 31 of the push button 8.

The push button 8 also has a vaporization chamber 26 housed in the second inner space 31.

The vaporization chamber 26 is connected at a first end 27 to the vaporization duct 22, by its second end 23, and opens out at a second end (not shown), opposite the first end 27 of the vaporization chamber 26, through the second cylindrical wall 24, enabling the perfume to be vaporized in the immediate vicinity of the bottle 1.

The sleeve 7 has a substantially cylindrical shape, and is provided with a third cylindrical side wall 27 and an upper opening 28 through which the push button 8 either emerges or does not depending on the position of the sleeve 7 in relation to the collar 6 (see details below).

The third cylindrical side wall 27 of the sleeve 7 defines a third outer face 33 and a third inner face 34 which delimits a third inner space 35 open to a third lower end 36 of the sleeve 7.

The mechanism 5 is provided here with a plurality of guide grooves 37 which are formed in the third inner face 34 of the sleeve 7.

The guide grooves 37 extend substantially from the third lower end 36 of the sleeve 7 to near an upper edge 38 of the sleeve 7, at its upper opening 28.

The guide grooves 37 are arranged substantially evenly here in the third inner space 35 of the sleeve 7.

The mechanism 5 is also provided here with a plurality of retaining notches 39 and a plurality of stop notches 40 formed in the third inner face 34 of the sleeve 7, at least partially projecting into the respective guide grooves 37.

The retaining notches 39 and the stop notches 40 are located on the side of the third lower end 36 of the sleeve 7, at a distance from its upper opening 28.

The mechanism 5 is configured here such that the arrangement of the guide grooves 37, retaining notches 39 and stop notches 40 in the third inner space 35 of the sleeve 7 and the arrangement of the complementary stop and guide notches 18 formed projecting from the outer face 12 of the collar 6 can cooperate.

In particular, the operation of the mechanism 5 is explained with reference to FIGS. 5 to 12.

As indicated above, the sleeve 7 is configured to be moved between the first position, known as the upper position, and the second position, known as the lower position.

Figure 5:
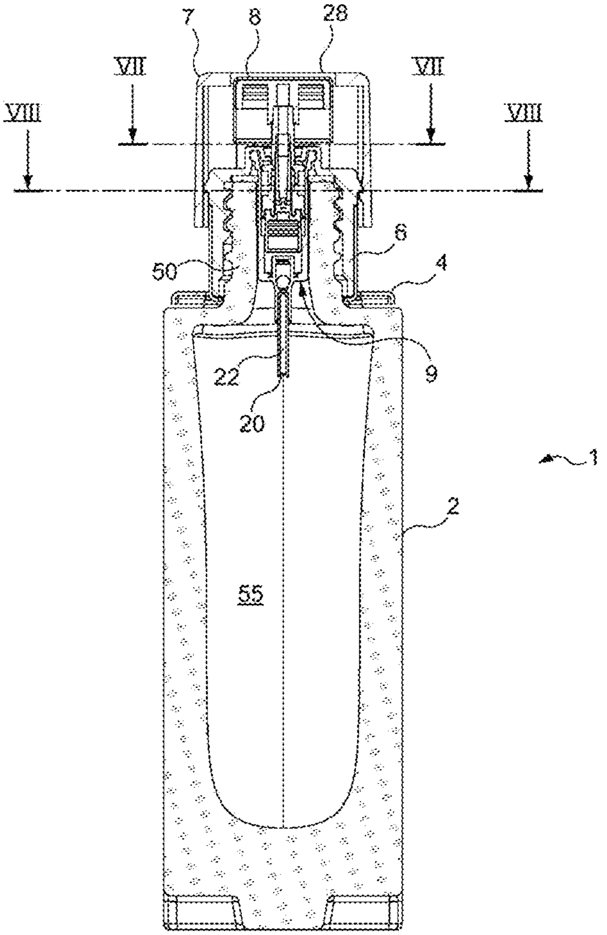
FIG. 5 is a cross-sectional view marked V-V in FIG. 1.
Figure 6:
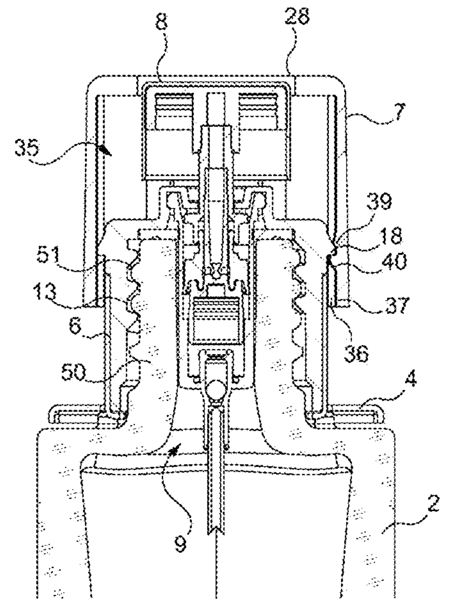
FIG. 6 shows the opening/closing and vaporizing mechanism in more detail in the storage configuration shown in FIG. 5.
Figure 7:
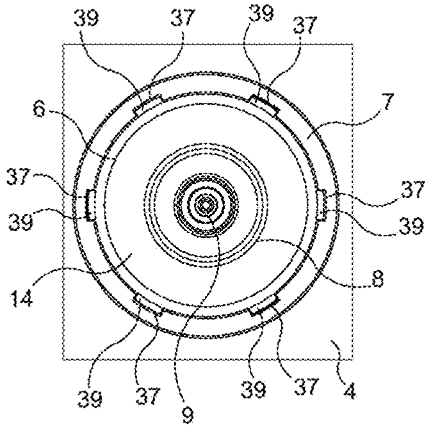
FIG. 7 is a cross-sectional view marked VII-VII in FIG. 5.
Figure 8:
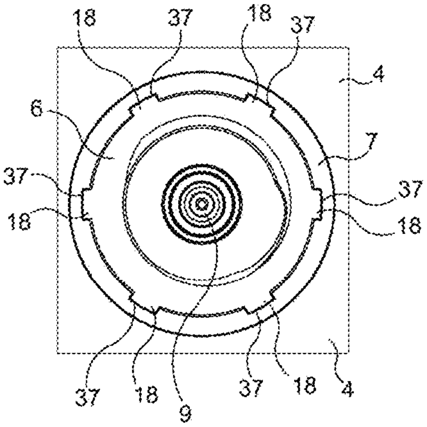
FIG. 8 is a cross-sectional view marked VIII-VIII in FIG. 5.

In the first position of the sleeve 7, shown in particular in FIGS. 5 and 6, the push button 8 is under the upper opening 28 of the sleeve 7 and is thus inaccessible.

The collar 6 is mounted by its first inner face 13 and by a rotational movement, in this case by screwing, on the outer face 51 of the neck 50 of the bottle 1.

The vaporization pump 9, connected to the collar 6, thus has the first end 20 of its vaporization duct 22 in the receiving volume 55 defined by the recipient 2 of the bottle 1.

In this first position of the sleeve 7, the collar 6 is only partially inserted into the third inner space 35 of the sleeve 7 and the third lower end 36 of the sleeve 7 is at a distance from the ornamental plate 4 mounted on the upper part 3 of the recipient 2 of the bottle 1.

Figure 11:
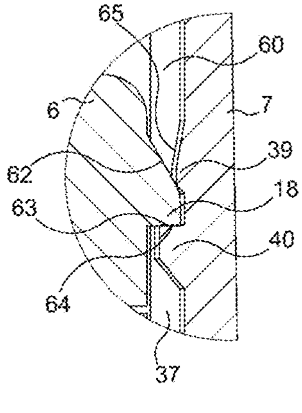
FIG. 11 shows a detail of FIG. 6.

In this first position of the sleeve 7, the complementary stop and guide notches 18 of the collar 6 are axially sandwiched between the stop notches 40 and the retaining notches 39 of the sleeve 7 such that the latter is held in the upper position with the push button 8 inaccessible (see FIG. 11).

In addition, the complementary stop and guide notches 18 of the collar 6 are transversely interposed between longitudinal edges 60 of the respective guide grooves 37.

In this position, it is possible to rotate the sleeve 7 relative to the collar 6 so as to unscrew the latter from the neck 50 of the bottle 1, for example to fill the latter, thus forming a refillable bottle 1.

Figure 9:
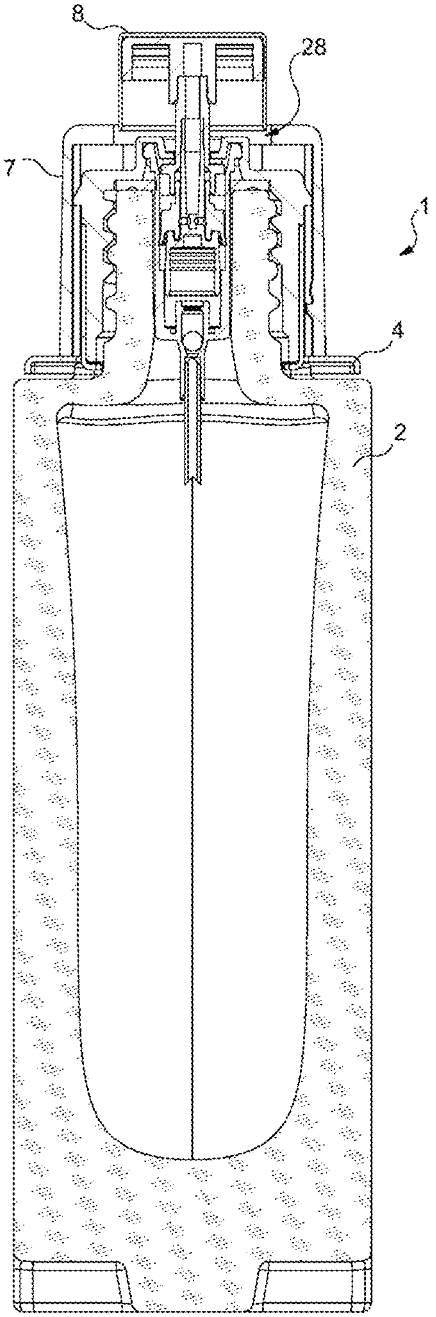
FIG. 9 is a median cross-sectional view of the bottle, as in FIG. 5, but with its opening/closing and vaporizing mechanism which is in a so-called vaporizing configuration here.
Figure 10:
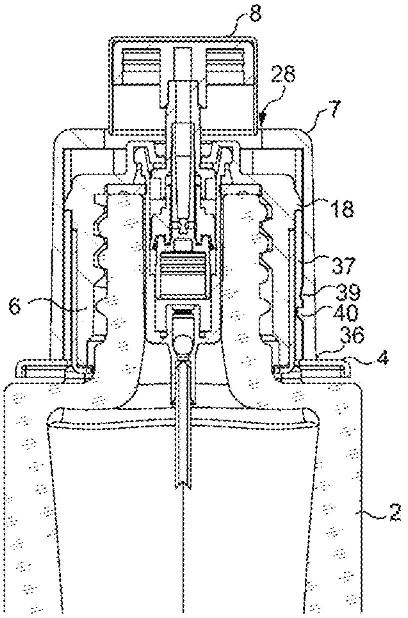
FIG. 10 shows the opening/closing and vaporizing mechanism in more detail in the vaporizing configuration shown in FIG. 9.

By contrast, in the second position of the sleeve 7, shown in particular in FIGS. 9 and 10, the sleeve 7 has been moved towards the ornamental plate 4 on the recipient 2 of the bottle 1, and the push button 8 emerges through the upper opening 28 of the sleeve 7 and is thus accessible to be operated by the user.

In this second position of the sleeve 7, the collar 6 is for the most part inserted into the third inner space 35 of the sleeve 7 and the third lower end 36 of the sleeve 7 is in the immediate vicinity of, or rests on, the ornamental plate 4 mounted on the upper part 3 of the recipient 2 of the bottle 1.

Figure 12:
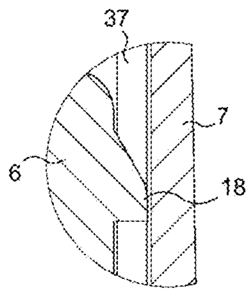
FIG. 12 shows a detail of FIG. 10.

In this second position of the sleeve 7, the complementary stop and guide notches 18 of the collar 6 have slid into guide grooves 37 and are at a distance from the retaining notches 39 and stop notches 40 of the sleeve 7, after having been urged against the retaining notches 39, such that the push button 8 is accessible (see FIG. 12).

To do this, the complementary stop and guide notches 18 of the collar 6 have here, on the one hand, a straight portion 63 provided to bear against a complementary straight portion of the stop notches 40 of the sleeve 7 and, on the other hand, a ramped portion 62 provided to cooperate with a substantially curved portion 65 of the retaining notches 39.

Such a configuration enables the complementary stop and guide notches 18 to be moved to either side of the retaining notches 39 when they are acted upon.

Thanks to the arrangement of the sleeve 7 and collar 6, the mechanism 5 provides a particularly easy and convenient solution to authorise or not authorise, and thus secure, the operation of the push button 8.

Indeed, by simply moving the sleeve 7 around and in relation to the collar 6, the mechanism 5 moves from a so-called storage configuration in which the push button 8 is inaccessible to a so-called vaporizing configuration in which the push button 8 is accessible.

In addition, thanks to the system of notches 18, 39 and 40 and guide grooves 37 as described above, the storage and vaporizing configurations of the mechanism 5 are configurations in which the sleeve 7 is in stable upper and lower positions.

Moreover, in the mechanism 5, the sleeve 7 and the collar 6 are configured so that rotating the sleeve 7 enables the collar 6 to be rotated with a view to removing it from the bottle 1, by the complementary stop and guide notches 18 cooperating with the longitudinal edges 60 of the guide grooves 37.

In other words, thanks to the arrangement of the sleeve 7 and collar 6, the mechanism 5 fulfils several functions here, including a function for accessing the push button 8 and a torque transmission function for disassembling the mechanism 5 with a view to filling the bottle 1, for example.

Variants not shown are set out below.

The guide grooves, the stop notches and the retaining notches are formed on the collar rather than on the sleeve, and the complementary stop and guide notches are formed on the sleeve rather than on the collar.

The mechanism can include more or fewer guide grooves, stop notches, retaining notches and complementary stop and guide notches.

The stop notches, retaining notches and complementary stop and guide notches can have different shapes than those described and shown.

The collar, sleeve and/or push button can have different shapes than a substantially cylindrical shape.

The bottle may not have an ornamental plate.

It should be noted more generally that the invention is not limited to the examples described and shown.

The invention claimed is:

1. Opening/closing and vaporizing mechanism for a bottle, including a vaporization pump (9) configured to be partially inserted into the bottle (1), a push button (8) connected to the vaporization pump and configured to operate it, characterised in that it includes a collar (6) configured to be connected on the bottle by a rotational movement of the collar relative to the bottle, with the push button which is mounted movable in translation above and relative to the collar, and a sleeve (7) mechanically connected to the collar and mounted movable in translation around and relative to the collar and to the push button, between a first position, known as the upper position, in which the push button is inaccessible and a second position, known as the lower position, in which the push button is accessible and can be operated by a user; with at least one of the sleeve and the collar which is provided with at least one guide groove (37), at least one retaining notch (39) formed in the guide groove and at least one stop notch (40) formed in the guide groove and facing the at least one retaining notch, while at least the other of the collar and the sleeve is provided with at least one complementary stop and guide notch (18) formed so as to project and face the at least one guide groove; and with the opening/closing and vaporizing mechanism which is configured such that, in the first position known as the upper position of the sleeve, the at least one complementary stop and guide notch is sandwiched between the at least one stop notch and the at least one retaining notch such that the sleeve is maintained in the upper position with the push button inaccessible, whilst in the second position known as the lower position, the at least one complementary stop and guide notch is at a distance from the at least one stop notch having been urged against the at least one retaining notch such that the push button is accessible.

2. Opening/closing and vaporizing mechanism according to claim 1, characterised in that the collar (6) is at least partially internally threaded and screwed onto the bottle (1).

3. Opening/closing and vaporizing mechanism according to claim 1, characterised in that the collar (6) has a substantially cylindrical shape, and is provided with a first cylindrical side wall (11) defining a first outer face (12) and a first inner face (13) which delimits, with an upper flange (14) of the collar, a first inner space (15) open to a first lower end (16).

4. Opening/closing and vaporizing mechanism according to claim 3, characterised in that the at least one complementary stop and guide notch (18) is formed on the first cylindrical side wall (11) projecting from the first outer face (12) of the collar (6).

5. Opening/closing and vaporizing mechanism according to claim 3, characterised in that the at least one complementary stop and guide notch (18) is located on the side of the upper flange (14), at a distance from the first lower end (16) of the collar (6).

6. Opening/closing and vaporizing mechanism according to claim 3, characterised in that the vaporization pump (9) includes a pump body (21) at least partially received in the first inner space (15) of the collar (6), and a vaporization duct (22) extending from the pump body and opening through an orifice (46) formed in the upper flange (14) of the collar.

7. Opening/closing and vaporizing mechanism according to claim 6, characterised in that the push button (8) has a second cylindrical wall (24), a support wall (25) sitting on top of the second cylindrical wall and a vaporization chamber (26) connected at a first end (27) to the vaporization duct (22) and opening out at a second end, opposite the first end, through the second cylindrical wall.

8. Opening/closing and vaporizing mechanism according to claim 1, characterised in that the sleeve (7) has a substantially cylindrical shape, and is provided with a third cylindrical side wall (27) and an upper opening (28) through which the push button (8) either emerges or does not depending on the position of the sleeve, and the opening/closing and vaporizing mechanism (5) is configured such that, in the first position of the sleeve, the push button is under the upper opening of the sleeve and is thus inaccessible; whereas in the second position of the sleeve, the push through the upper opening of the sleeve and is thus accessible to be operated by the user.

9. Opening/closing and vaporizing mechanism according to claim 8, characterised in that the third cylindrical side wall (27) of the sleeve (7) defines a third outer face (33) and a third inner face (34) which delimits a third inner space (35) open to a third lower end (36).

10. Opening/closing and vaporizing mechanism according to claim 8, characterised in that the at least one guide groove (37) is formed in the third inner face (34) of the sleeve (7), and the at least one retaining notch (39) and the at least one stop notch (40) are formed in the third inner face of the sleeve, at least partially projecting into the at least one guide groove.

11. Opening/closing and vaporizing mechanism according to claim 8, characterised in that the at least one guide groove (37) extends substantially from the third lower end (36) of the sleeve (7) to near an upper edge of the sleeve, at its upper opening (28); and the at least one retaining notch (39) and the at least one stop notch (40) are located on the side of the third lower end of the sleeve, at a distance from its upper opening.

12. Bottle including a receptacle (2) defining a volume (55) and having a neck (50) above it, and an opening/closing and vaporizing mechanism (5) according to claim 1, which is connected by a rotational movement on the neck of the receptacle.

13. Bottle according to claim 12, characterised in that the vaporization pump (9) is partially inserted into the neck (50) and opens at a first end (20) into the volume (55) of the recipient (2).

14. Bottle according to claim 12, characterised in that the push button (8) is connected to a second end (22) of the vaporization pump (9), opposite its first end (20).

15. Bottle according to claim 12, characterised in that the collar (6) is internally threaded and screwed onto an outer face (51) of the neck (50).

* * * * *